United States Patent
Nakanishi et al.

(10) Patent No.: US 12,425,105 B2
(45) Date of Patent: Sep. 23, 2025

(54) OPTICAL BURST TRANSMITTER

(71) Applicant: Nippon Telegraph and Telephone Corporation, Tokyo (JP)

(72) Inventors: Yasuhiko Nakanishi, Musashino (JP); Shigeru Kanazawa, Musashino (JP); Toshihide Yoshimatsu, Musashino (JP); Atsushi Kanda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 217 days.

(21) Appl. No.: 18/043,925

(22) PCT Filed: Sep. 8, 2020

(86) PCT No.: PCT/JP2020/034014
§ 371 (c)(1),
(2) Date: Mar. 3, 2023

(87) PCT Pub. No.: WO2022/054147
PCT Pub. Date: Mar. 17, 2022

(65) Prior Publication Data
US 2023/0327775 A1 Oct. 12, 2023

(51) Int. Cl.
*H04B 10/508* (2013.01)
*H04B 10/50* (2013.01)

(52) U.S. Cl.
CPC ......... *H04B 10/508* (2013.01); *H04B 10/505* (2013.01)

(58) Field of Classification Search
CPC ....... G02F 1/01; H04B 10/505; H04B 10/508; H04B 15/00; H04B 17/00; H04B 2215/00
See application file for complete search history.

(56) References Cited

U.S. PATENT DOCUMENTS 6,823,142 B1 * 11/2004 Tanaka ................ G02B 6/278
359/489.08
6,823,145 B1 * 11/2004 Shirai ................. H04B 10/505
359/254

(Continued)

FOREIGN PATENT DOCUMENTS

JP 1998173448 * 12/1996
JP 09-307169 11/1997

(Continued)

OTHER PUBLICATIONS

Tiago Sutili et al., "Energy Efficient Switching Technique for High-Speed Electro-Optical Semiconductor Optical Amplifiers", Dec. 15, 2019, Journal of Lightwave Technology, vol. 37, No. 24, p. 1-3 (Year: 2019).*

(Continued)

*Primary Examiner* — Pranesh K Barua
(74) *Attorney, Agent, or Firm* — Workman Nydegger

(57) ABSTRACT

A highly efficient optical burst transmitter is provided. An embodiment is an optical burst transmitter including a control circuit configured to output a data signal and a burst control signal and a semiconductor optical amplifier configured to output an optical data signal modulated using the data signal as an optical burst data signal controlled using the burst control signal, the optical burst transmitter including: an electric line configured to connect the control circuit and the semiconductor optical amplifier and transmit the burst control signal; and an impedance matching circuit configured to impedance-match a characteristic impedance of the electric line and the semiconductor optical amplifier with each other.

7 Claims, 12 Drawing Sheets

(56) References Cited

U.S. PATENT DOCUMENTS

2012/0121219 A1  5/2012  Yoshida et al.
2018/0287575 A1* 10/2018  Tatsumi .................. H03F 3/605
2020/0220623 A1*  7/2020  Roberts .................. H04B 10/27

FOREIGN PATENT DOCUMENTS

| JP | 10-98451     | 4/1998 |
| JP | 2003-23208 A | 1/2003 |
| JP | 2008-84891 A | 4/2008 |
| JP | 2012-108210  | 6/2012 |

OTHER PUBLICATIONS

Katsuhisa Taguchi et al., *High Output Power and Burst Extinction Ratio ONU Using a Simple Configuration Booster SOA with Gain Peak Detuning for WDM/TDM-PON*, Optical Society of America, 2014, pp. 1-3.

* cited by examiner

Prior Art

OPTICAL BURST TRANSMITTER

TECHNICAL FIELD

The present invention relates to an improvement in efficiency of an optical burst transmitter.

BACKGROUND ART

Internet traffic has recently rapidly increased due to video services or the like, and there is a rapid need to increase the speed and sophistication of an optical access system which supports this. Many optical access systems are constructed by a system using a topology called a passive optical network (PON).

FIG. 1 is a diagram showing a concept of a PON system in the related art. The PON system accommodates in-house devices (optical network unit; ONU) $3_1$ to $3_N$ installed in a plurality of subscribers' houses for one terminal unit (optical line terminal; OLT) 1 installed in an accommodation station through an optical splitter 2 installed in an optical fiber transmission line. An optical access system has a plurality of subscribers who share an optical fiber transmission path 4, the optical splitter 2, and the OLT 1. A downlink signal (DN0) from the OLT 1 to ONUs $3_1$ to $3_N$ is time-division-multiplexed (undergoes time division multiplexing (TDM)), branched by the optical splitter 2 (DN1-DNN), and transmitted to each subscriber. Uplink signals (UP1 to UPN) from the ONUs $3_1$-$3_N$ are multiplexed by time division multiple access (TDMA) from each subscriber and transmitted to the (UP0) OLT 1. At this time, a guard time T is set to prevent interference between the uplink signals from each ONU.

In the PON system, B-PON, G-PON, XG-PON, and NG-PON2 are standardized in ITU-T, and GE-PON and 10GE-PON are standardized in IEEE. A transmission rate per wavelength is increased to 10 Gbps. Aiming at speeding up and increasing sophistication of PON systems, next-generation PON systems are being studied, and discussions on systems called 50G-PON for ITU-T and 25G-EPON for IEEE have begun. In these PON systems, a transmission rate per wavelength is being examined at 25 Gbps and 50 Gbps, which exceeds 10 Gbps in the related art.

In order to realize such a high transmission rate, it is necessary to increase the speed of an optical transceiver. Since a plurality of ONUs are accommodated in one OLT in a PON system, it is necessary to turn on or turn off an optical signal at an arbitrary timing from each ONU, and in order to achieve this, it is essential to increase the speed of the optical burst transmitter. Further, since the reception sensitivity of the receiver deteriorates as the speed is increased, it is essential to increase the output of the optical burst transmitter to secure the same budget as that of the 10 Gbps class system.

FIG. 2 shows a configuration of an optical burst transmitter in the related art. In an optical burst transmitter 10, a MAC chip 11 for a burst signal, a laser driver 12 for direct modulation for a burst signal, and a laser 13 for direct modulation are connected in this order. A data signal and a burst control signal are output from the MAC chip 11 for a burst signal. The data signal and the burst control signal are input to the laser driver 12 for direct modulation for a burst signal. The laser driver 12 for direct modulation for a burst signal is turned ON and a burst data signal is output when an ON signal of the burst control signal is input to the laser driver 12 for direct modulation for a burst signal. This burst data signal is directly input to the direct modulation laser 13, and an optical burst data signal is generated. The laser driver for direct modulation for a burst signal is turned off and a burst data signal is not output when an OFF signal of the burst control signal is input to the laser driver 12 for direct modulation for a burst signal.

In order to increase the speed of the optical burst transmitter, it is essential to increase the speeds of all these components. However, although the speed of the high-speed direct modulation laser at a practical level has been studied to increase the speed, it is currently to the 25 Gbps class level. Further, in order to increase the speed of the direct modulation laser, it is necessary to shorten a resonator length of a laser. Since the power of output light decreases along with this, an object is to achieve both high speed and high output.

FIG. 3 shows a configuration of an optical burst transmitter using an external modulator and a semiconductor optical amplifier in the related art. As a method for solving the above problem, there is a method in which the external modulator and the semiconductor optical amplifier are used instead of the laser for direct modulation (for example, refer to NPL). An optical burst transmitter 20 realizes high speed using an external modulator 24 and high output using a semiconductor optical amplifier 25. In the optical burst transmitter 20, a data signal generated from a burst signal MAC chip 21 is input to the external modulator 24 via a driver 22. A non-modulated optical signal is also input from the laser 23 to the external modulator 24, and a modulated optical data signal is input from the external modulator 24 to the semiconductor optical amplifier 25. A burst control signal output from the MAC chip 21 for a burst signal is input to the semiconductor optical amplifier 25, and when the burst control signal is ON, an optical burst data signal is output from the semiconductor optical amplifier 25, and when the burst control signal is OFF, the optical data signal is turned off in the semiconductor optical amplifier 25, and the optical burst data signal is not output. In the optical burst transmitter 20, a device dedicated to the burst signal is only the MAC chip and other devices for normal continuous signals can be used. Therefore, the cost of the optical burst transmitter can be reduced.

A problem of an optical burst transmitter in the related art will be described with reference to FIG. 4. A delay $d_{DN}$ of several 10 nsec to several 100 ns occurs at a falling edge of the optical burst data signal when the burst control signal is shifted from ON to OFF. Similarly, a delay dup occurs also at a rising edge of the optical burst data signal when the burst control signal is shifted from OFF to ON. As shown in FIG. 1, a guard time is set to prevent interference when uplink signals from each ONU are switched between. It is necessary to lengthen the guard time, and data transmission becomes inefficient when a falling delay and a rising delay of the optical burst data signal occur.

CITATION LIST

Non Patent Literature

[NPL 1] Katsuhisa Taguchi, et al., "High Output Power and burst extinction ratio ONU using a simple configuration booster SOA with gain peak detuning for WDM/TDM-PON", OFC 2014 (C) OSA 2014, W3G.7.pdf

SUMMARY OF INVENTION

An object of the present invention is to provide a highly efficient optical burst transmitter.

In order to achieve such an object, an embodiment of the present invention is an optical burst transmitter including a control circuit configured to output a data signal and a burst control signal and a semiconductor optical amplifier configured to output an optical data signal modulated using the data signal as an optical burst data signal controlled using the burst control signal, the optical burst transmitter including: an electric line configured to connect the control circuit and the semiconductor optical amplifier and transmit the burst control signal; and an impedance matching circuit configured to impedance-match characteristic impedances of the electric line and the semiconductor optical amplifier with each other.

According to this configuration, it is possible to prevent a falling delay and a rising delay of an optical burst data signal and to provide a highly efficient optical burst transmitter.

DESCRIPTION OF EMBODIMENTS

Embodiments of the present invention will be described in detail below with reference to the drawings.

Optical Burst Transmitter

Figure 1:
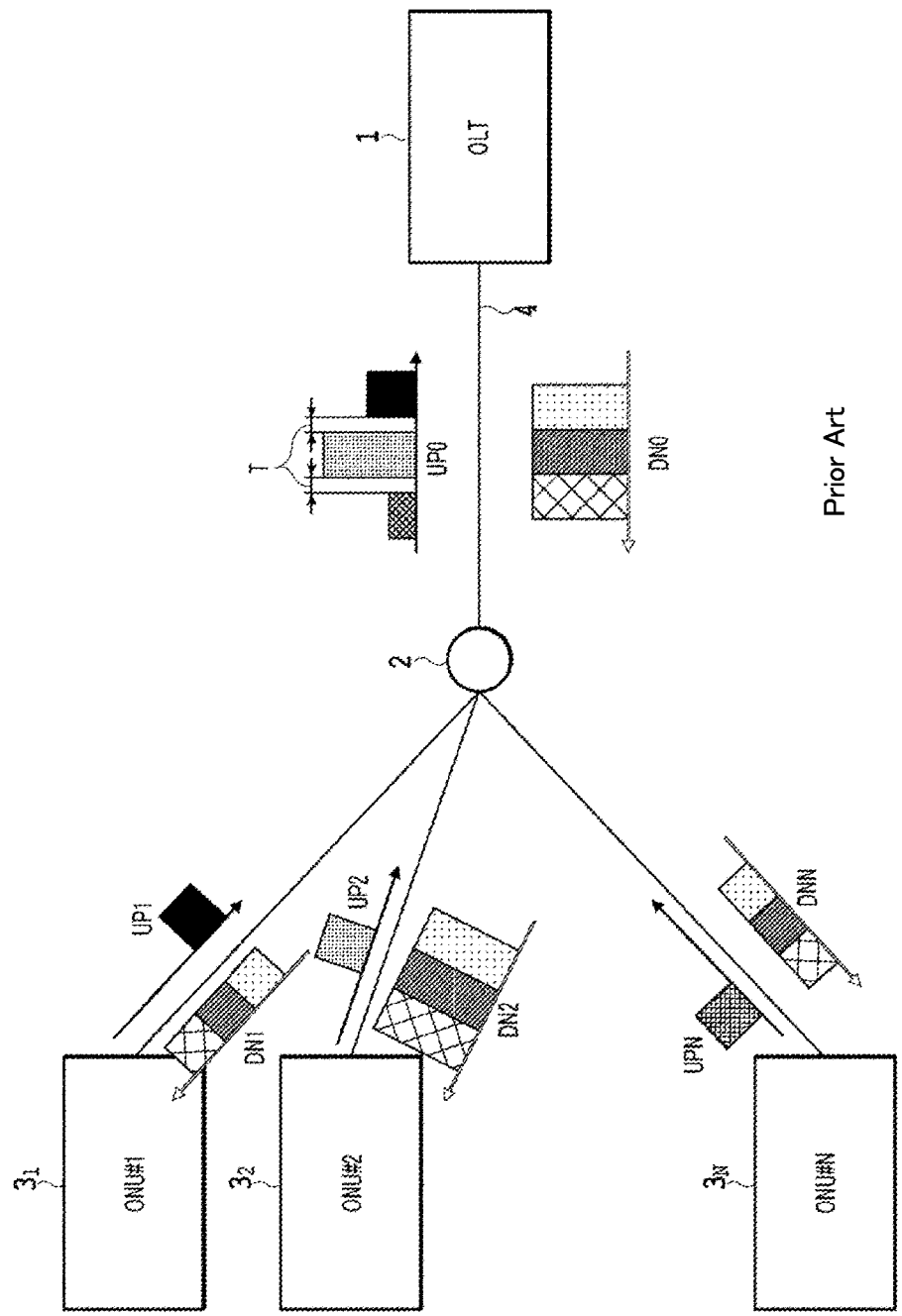
FIG. 1 is a diagram showing a concept of a conventional PON system.
Figure 2:
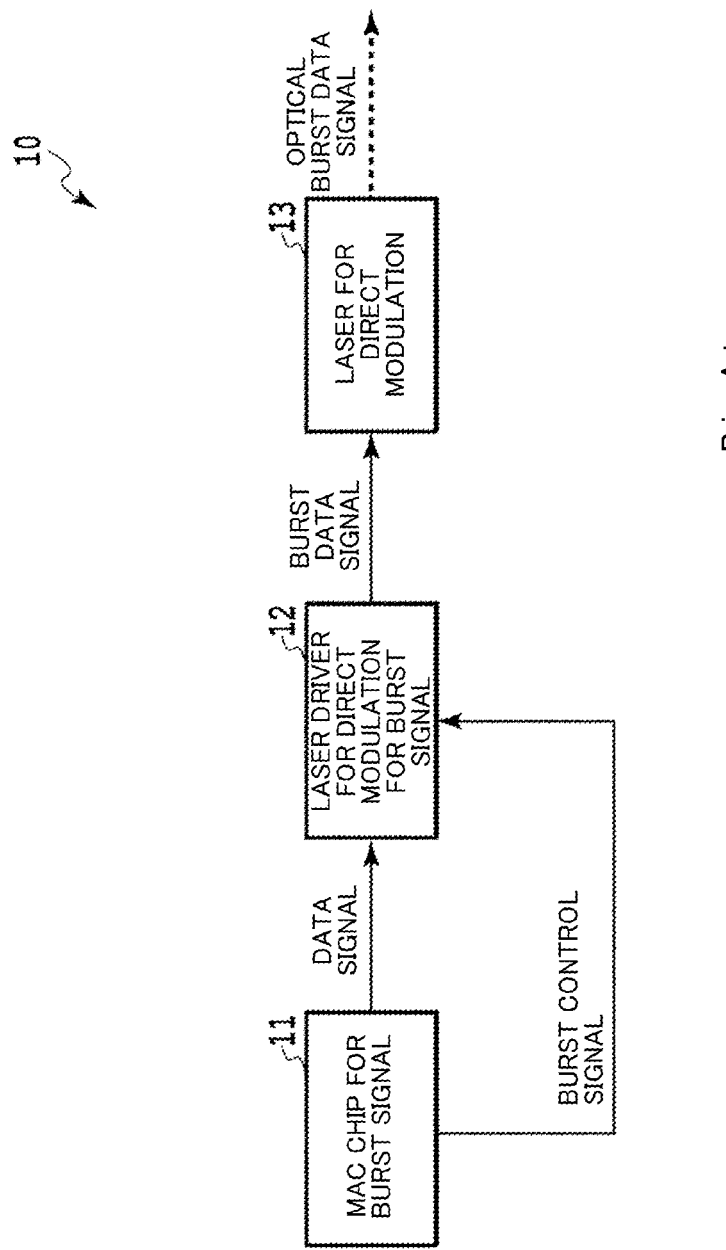
FIG. 2 is a diagram showing a configuration of an optical burst transmitter in the related art.
Figure 3:
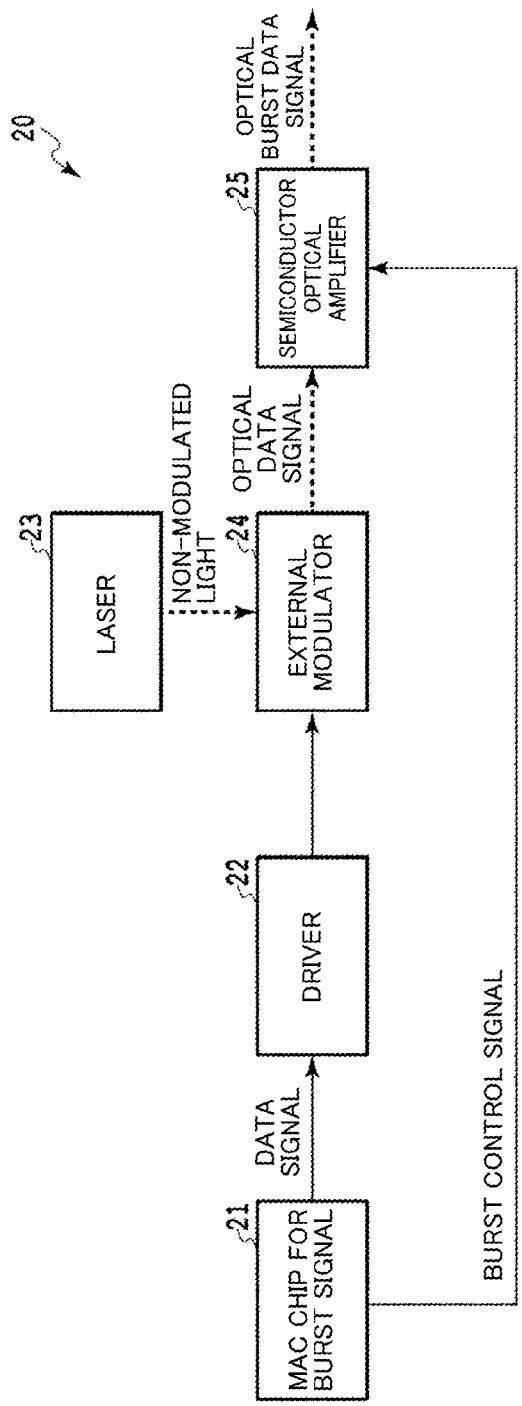
FIG. 3 is a diagram showing a configuration of an optical burst transmitter using an external modulator and a semiconductor optical amplifier in the related art.
Figure 4:
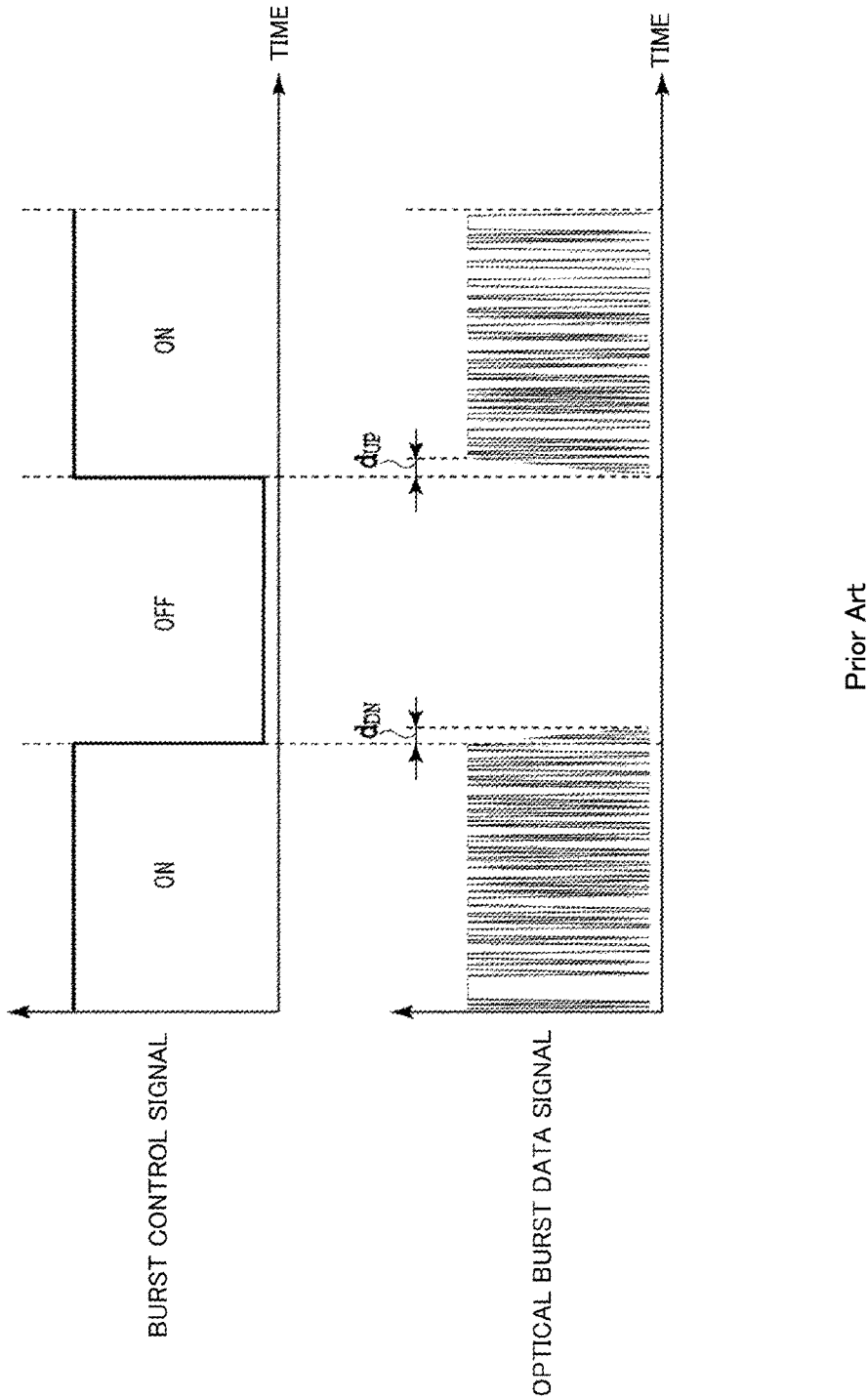
FIG. 4 is a diagram for explaining problems of the optical burst transmitter in the related art.
Figure 5:
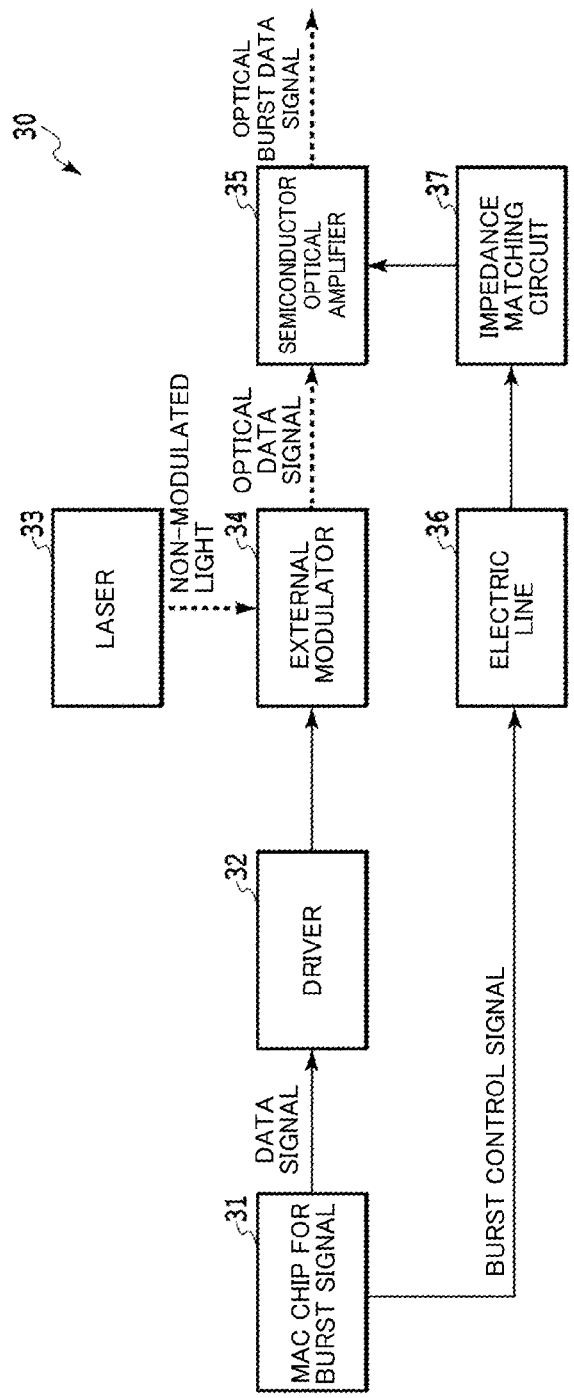
FIG. 5 is a diagram showing a configuration of an optical burst transmitter according to an embodiment of the present invention.

FIG. 5 shows a configuration of an optical burst transmitter according to an embodiment of the present invention. An optical burst transmitter 30 includes: a media access control (MAC) chip 31 for burst signals that is a control circuit from which a data signal and a burst control signal are output; a driver 32 which amplifies the data signal; an external modulator 34 in which non-modulated light is input from a laser 33, the non-modulated light is modulated using a data signal, and an optical data signal is output; and a semiconductor optical amplifier 35 which amplifies and turns off an optical data signal according to the burst control signal which are connected in order. An electric line 36 which transmits the burst control signal connects the MAC chip 31 for burst signals and the semiconductor optical amplifier 35 through an impedance matching circuit 37 for impedance matching.

The laser 33 and the external modulator 34 may be integrally integrated, and the semiconductor optical amplifier 35 may also be integrally integrated. The impedance matching circuit 37 may be installed in the same package as the semiconductor optical amplifier.

First Embodiment

Figure 6:
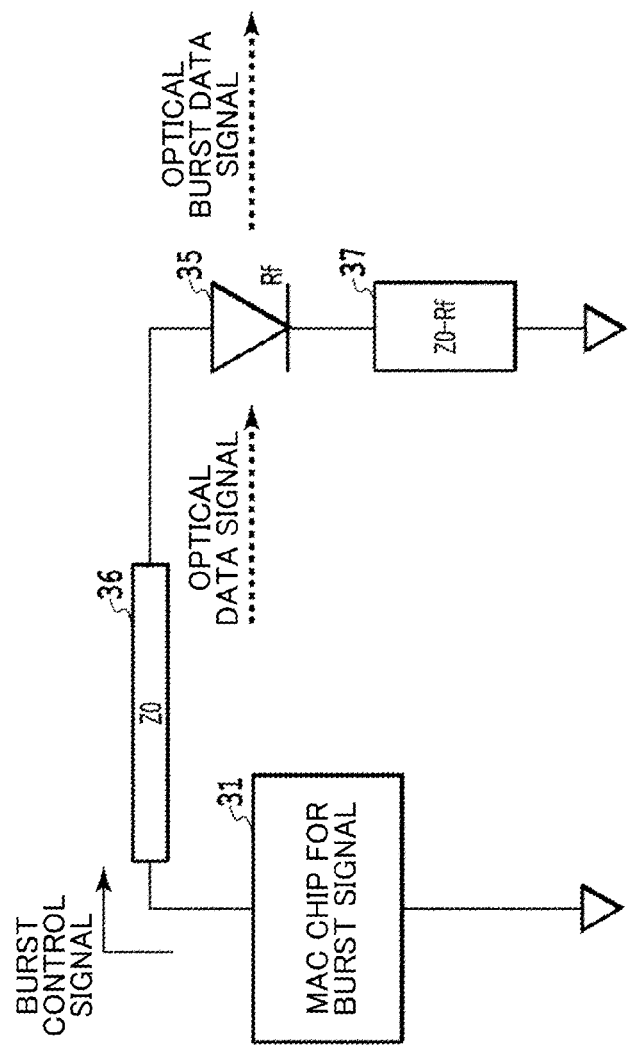
FIG. 6 is a diagram for explaining an operation of an optical burst transmitter according to a first embodiment.

An operation of an optical burst transmitter of a first embodiment will be described with reference to FIG. 6. A burst control signal output from the burst signal MAC chip 31 is input to the semiconductor optical amplifier 35 through the electric line 36. The semiconductor optical amplifier 35 amplifies the optical data signal when the burst control signal is shifted from OFF to ON. At this time, the burst control signal amplifies the optical data signal by inputting a forward current to the semiconductor optical amplifier 35.

Generally, a characteristic impedance of an electric line which transmits a high-speed data signal is set to 50Ω. On the other hand, a forward resistance of the semiconductor optical amplifier 35 is a very low value of about several Ω (Rf). Thus, in order to impedance-match a characteristic impedance Z0 of the electric line 36 which transmits a burst control signal with the semiconductor optical amplifier 35, the impedance matching circuit 37 having a resistance value of Z0-RF is inserted in series with the semiconductor optical amplifier 35. With such a configuration, when the burst control signal is switched from OFF to ON, it is possible to prevent a delay of the rising edge of the optical burst data signal.

Second Embodiment

Figure 7:
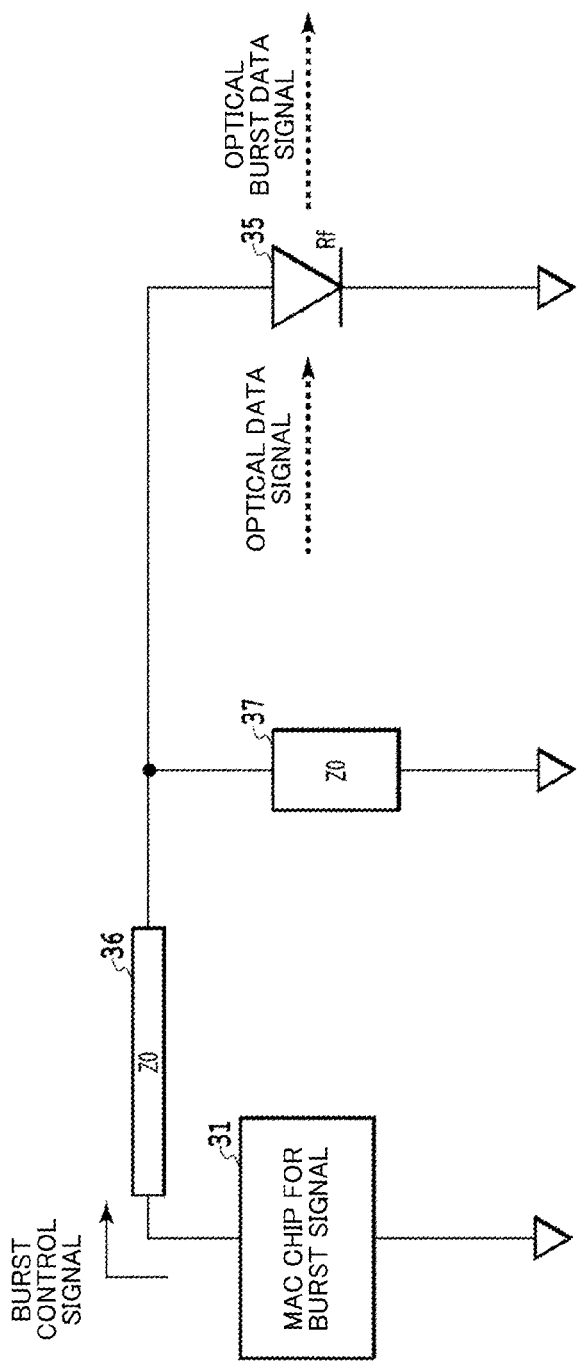
FIG. 7 is a diagram for explaining an operation of an optical burst transmitter according to a second embodiment.

An operation of an optical burst transmitter of a second embodiment will be described with reference to FIG. 7. The burst control signal output from a burst signal MAC chip 31 is input to a semiconductor optical amplifier 35 through an electric line 36. When the burst control signal is changed from ON to OFF, it is necessary to turn off an optical data signal using the semiconductor optical amplifier 35. At this time, the burst control signal absorbs the optical data signal by inputting a current in a reverse direction to the semiconductor optical amplifier 35.

The resistance in the reverse direction of the semiconductor optical amplifier generally has a large value and is considered to be infinite effectively. Thus, in order to impedance-match a characteristic impedance Z0 of the electric line 36 and the semiconductor optical amplifier 35 with each other, an impedance matching circuit 37 having a resistance value of Z0 is inserted in parallel with the semiconductor optical amplifier 35. With such a configuration, when the burst control signal is changed from ON to OFF, the optical burst data signal can be turned off by preventing the delay of the falling edge of the optical burst data signal.

Third Embodiment

Since the resistor serving as the impedance matching circuit 37 and the semiconductor optical amplifier 35 are arranged in series in the optical burst transmitter of the first embodiment, it is possible to prevent the delay in rising of the optical burst data signal when the burst control signal is changed from OFF to ON. On the other hand, when the burst control signal is changed from ON to OFF, the optical burst data signal has a delay in falling.

Since the resistor serving as the impedance matching circuit 37 and the semiconductor optical amplifier 35 are arranged in parallel in the optical burst transmitter of the second embodiment, the delay in falling of the optical burst data signal can be prevented when the burst control signal is changed from ON to OFF. On the other hand, when the burst control signal is changed from OFF to ON, the optical burst data signal has a delay in rising. Therefore, in order to prevent both the delay in rising and the delay in falling, an impedance matching circuit in which resistances are inserted in both series and parallel is required for the semiconductor optical amplifier 35.

Figure 8:
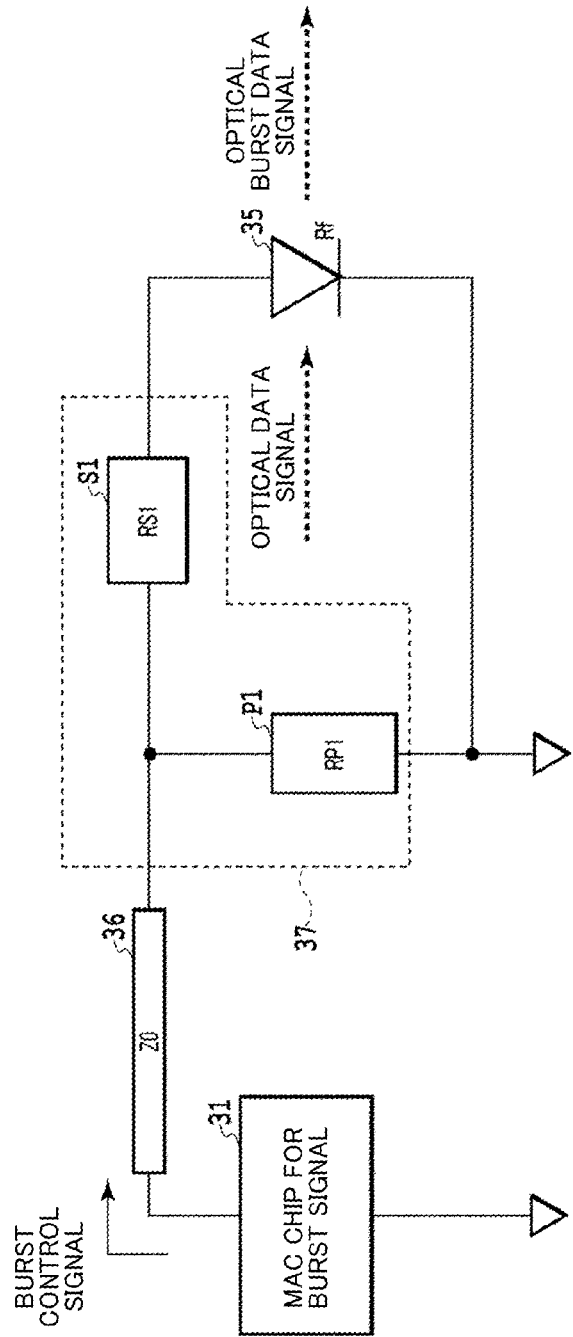
FIG. 8 is a diagram for explaining an operation of an optical burst transmitter according to a third embodiment.

An operation of the optical burst transmitter of the third embodiment will be described with reference to FIG. 8. The burst control signal output from the burst signal MAC chip 31 is input to the semiconductor optical amplifier 35 through the electric line 36. When the burst control signal is changed from ON to OFF, the optical data signal needs to be turned off by the semiconductor optical amplifier 35. At this time, the burst control signal absorbs the optical data signal by inputting a current in the reverse direction to the semiconductor optical amplifier 35. The resistance in the reverse direction of the semiconductor optical amplifier generally has a large value and is considered to be infinite effectively. Thus, in order to impedance-match the characteristic impedance Z0 of the electric line 36 and the semiconductor optical amplifier 35 with each other, a resistor P1 which has a resistance value of RP1 is inserted in parallel with the semiconductor optical amplifier 35.

When the burst control signal is changed from OFF to ON, the semiconductor optical amplifier 35 amplifies the optical data signal. At this time, the burst control signal amplifies the optical data signal by inputting a current in a forward direction to the semiconductor optical amplifier 35. A resistance in the forward direction of the semiconductor optical amplifier 35 is a very low value of about several Ω (Rf). Thus, in order to impedance-match the characteristic impedance Z0 of an electric line 36 which transmits a burst control signal and the semiconductor optical amplifier 35 with each other, a resistor S1 having a resistance value of RS 1 is inserted in series with the semiconductor optical amplifier 35. In this way, the impedance matching circuit 37 of the third embodiment is composed of the resistor P1 and the resistor S1.

An impedance Zon obtained by combining the impedance matching circuit 37 and the semiconductor optical amplifier 35 when the burst control signal is changed from OFF to ON satisfies the following.

Math. 1

$$RP1 \times \frac{RS1 + Rf}{RS1 + RP1 + Rf}$$

An impedance Zoff obtained by combining the impedance matching circuit 37 and the semiconductor optical amplifier 35 when the burst control signal is changed from ON to OFF is RP1.

Although [Math. 2] needs to be satisfied in order for the impedance Zon when the burst control signal is changed from OFF to ON and the impedance Zoff when the burst control signal is changed from ON to OFF to match, there are no resistance values of RS1 and RP1 which satisfy this.

Math. 2

$$RP1 \times \frac{RS1 + Rf}{RS1 + RP1 + Rf} = RP1$$

Therefore, one of Zon and Zoff is set to a value which matches the characteristic impedance Z0 of the electric line, the delay of one of rising and falling is prevented and the delay of the other is set to an allowable value.

When values of resistors S1 and P1 are set so that

Math. 3

$$RP1 \times \frac{RS1 + Rf}{RS1 + RP1 + Rf} = Z0$$

is satisfied, the impedance Zon obtained by combining the impedance matching circuit 37 and the semiconductor optical amplifier 35 when the burst control signal is changed from OFF to ON, matches the characteristic impedance Z0 of the electric line 36. This makes it possible to prevent the delay in rising of the optical burst data signal.

Furthermore, when the value of the resistor P1 is set so that RP1=Z0 is satisfied, the impedance Zoff obtained by combining the impedance matching circuit 37 and the semiconductor optical amplifier 35 when the burst control signal is changed from ON to OFF, matches the characteristic impedance Z0 of the electric line 36. Thus, the optical burst data signal can be turned off by preventing the delay in falling of the optical burst data signal.

Fourth Embodiment

Since the resistor serving as the impedance matching circuit 37 and the semiconductor optical amplifier 35 are arranged in series in the optical burst transmitter of the first embodiment, it is possible to prevent the delay in rising of the optical burst data signal when the burst control signal is changed from OFF to ON. On the other hand, when the burst control signal is changed from ON to OFF, the optical burst data signal has a delay in falling.

Since the resistor serving as the impedance matching circuit 37 and the semiconductor optical amplifier 35 are arranged in parallel in the optical burst transmitter of the second embodiment, the delay in falling of the optical burst data signal can be prevented when the burst control signal is changed from ON to OFF. On the other hand, when the burst control signal is changed from OFF to ON, the optical burst data signal has a delay in rising. Therefore, in order to prevent both the delay in rising and the delay in falling, an impedance matching circuit in which resistances are inserted in both series and parallel is required for the semiconductor optical amplifier 35.

Figure 9:
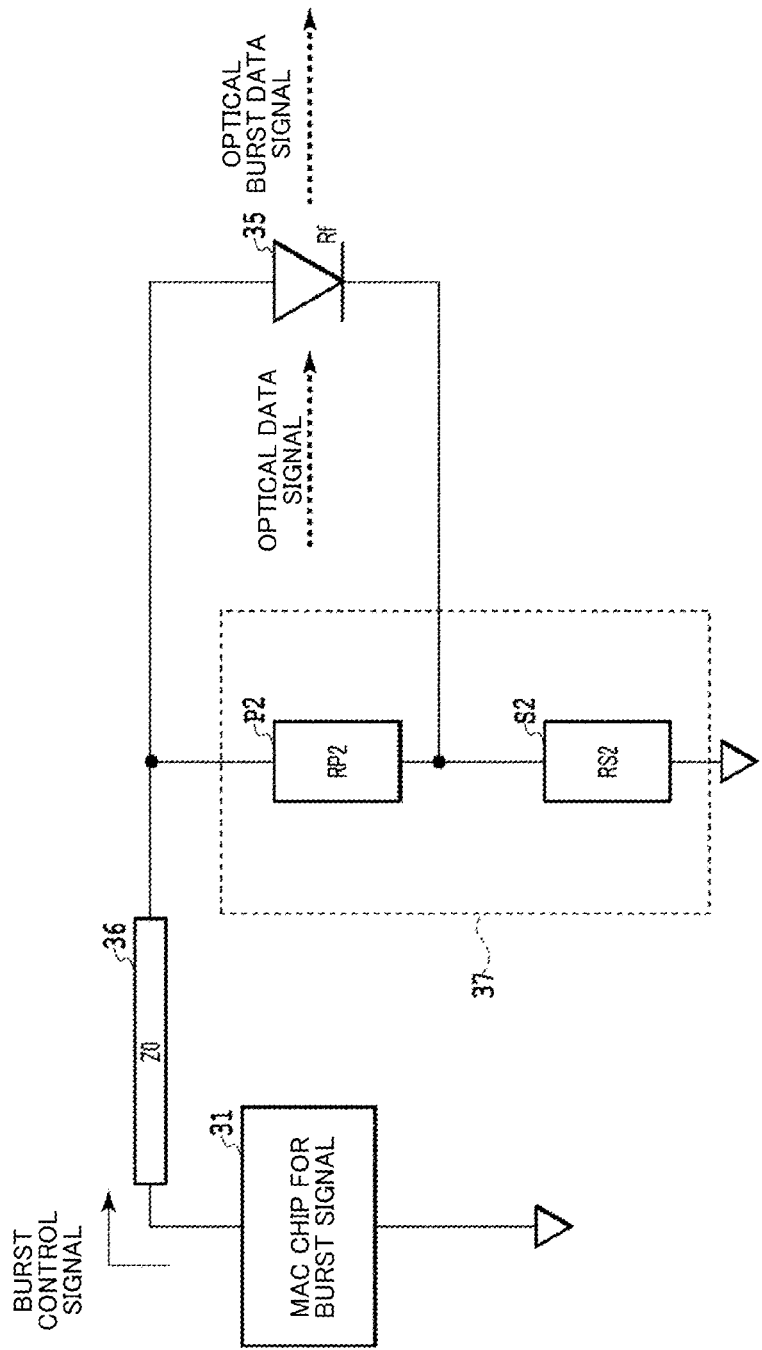
FIG. 9 is a diagram for explaining an operation of an optical burst transmitter according to a fourth embodiment.

An operation of an optical burst transmitter of a fourth embodiment will be described with reference to FIG. 9. A burst control signal output from a burst signal MAC chip 31 is input to a semiconductor optical amplifier 35 through an electric line 36. When the burst control signal is changed from ON to OFF, the optical data signal needs to be turned off using the semiconductor optical amplifier 35. At this time, the burst control signal absorbs the optical data signal by inputting a current in the reverse direction to the semiconductor optical amplifier 35. The resistance in the reverse direction of the semiconductor optical amplifier generally has a large value and is considered to be infinite effectively.

Thus, in order to impedance-match a characteristic impedance Z0 of the electric line 36 and the semiconductor optical amplifier 35 with each other, a resistor P2 which has a resistance value of RP2 is inserted in parallel with the semiconductor optical amplifier 35.

When the burst control signal is changed from OFF to ON, the semiconductor optical amplifier 35 amplifies the optical data signal. At this time, the burst control signal amplifies the optical data signal by inputting a current in a forward direction to the semiconductor optical amplifier 35. A resistance in the forward direction of the semiconductor optical amplifier 35 is a very low value of about several Ω (Rf). Thus, in order to impedance-match the characteristic impedance Z0 of the electric line 36 which transmits a burst control signal and the semiconductor optical amplifier 35 with each other, a resistor S2 having a resistance value of RS2 is inserted in series with a parallel circuit composed of the semiconductor optical amplifier 35 and the resistor P2. In this way, the impedance matching circuit 37 of the fourth embodiment is composed of the resistor P2 and the resistor S2.

The resistance values of the resistors P2 and S2 need to match the characteristic impedance Z0 of the electric line 36. An impedance Zon obtained by combining the impedance matching circuit 37 and the semiconductor optical amplifier 35 when the burst control signal is changed from OFF to ON satisfies the following.

Math. 4

$$\frac{Rf \times RP2}{Rf + RP2} + RS2$$

An impedance Zoff obtained by combining the impedance matching circuit 37 and the semiconductor optical amplifier 35 when the burst control signal is changed from ON to OFF satisfies RS2+RP2.

Although [Math. 5] needs to be satisfied in order for the impedance Zon when the burst control signal is changed from OFF to ON and the impedance Zoff when the burst control signal is changed from ON to OFF to match, there are no resistance values of RS1 and RP1 which satisfy this.

Math. 4

$$\frac{Rf \times RP2}{Rf + RP2} + RS2 = RS2 + RP2$$

Therefore, Zon and Zoff need to have values which substantially match the characteristic impedance Z0 of the electric line 36. At this time, one index is that a return loss RL is 20 dB or more in a high frequency circuit. The return loss is expressed as Math. 6

$$RL = -20 \log_{10} \left| \frac{ZL - Z0}{ZL + Z0} \right| \text{(dB)}$$

when the characteristic impedance is Z0 and the input impedance is ZL. A range of ZL is 0.82×Z0<ZL<1.22×Z0 and can be expressed in a range in which the following Expressions (1) and (2) are boundary lines.

Math. 7

$$0.82 \times Z0 < \frac{Rf \times RP2}{Rf + RP2} + RS2 < 1.22 \times Z0 \quad \text{Expression (1)}$$

$$0.82 \times Z0 < RS2 + RP2 < 1.22 \times Z0 \quad \text{Expression (2)}$$

Figure 10:
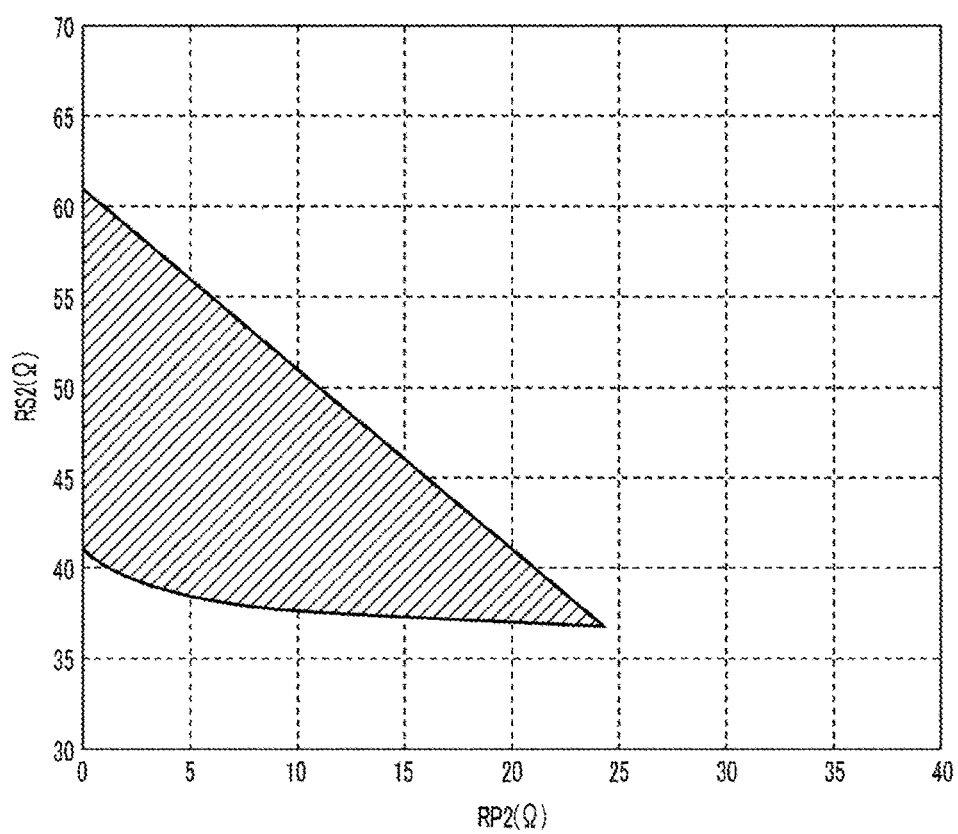
FIG. 10 is a diagram showing a range of resistance values of an impedance matching circuit of the fourth embodiment.

FIG. 10 shows a range of resistance values of the impedance matching circuit according to the fourth embodiment. When Rf=5Ω and Z0=50Ω, the range satisfying Expression (1) and (2) is shown. When values of RP2 and RS2 which satisfy Expressions (1) and (2) are selected in accordance with any Rf, it is possible to configure an impedance matching circuit 37 having a reflection attenuation amount of 20 dB or more and substantially matching the characteristic impedance Z0 of the electric line 36. From this, it is possible to substantially prevent the delay in falling and the delay in rising of the optical burst data signal both when the burst control signal is changed from OFF to ON when the burst control signal is changed from ON to OFF.

Fifth Embodiment

Figure 11:
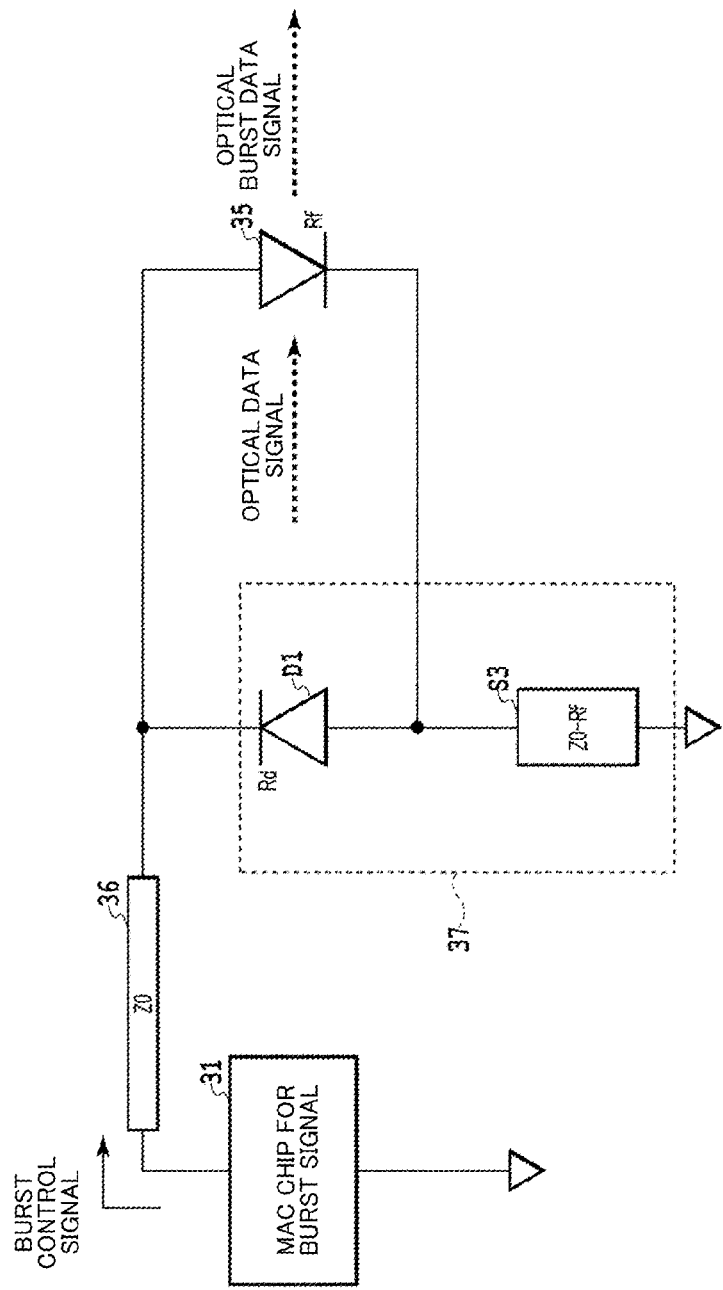
FIG. 11 is a diagram for explaining an operation of an optical burst transmitter according to a fifth embodiment.

An operation of an optical burst transmitter according to a fifth embodiment will be described with reference to FIG. 11. A burst control signal output from a burst signal MAC chip 31 is input to a semiconductor optical amplifier 35 through an electric line 36. An impedance matching circuit 37 of the fifth embodiment has a configuration in which the resistor P2 of the impedance matching circuit 37 of the fourth embodiment is replaced with a diode D1. The diode D1 is inserted in parallel with the semiconductor optical amplifier 35 in a reverse direction. The diode D1 has the same resistance in the forward and reverse directions as the resistance value of the semiconductor optical amplifier 35. In the impedance matching circuit 37, a resistor S3 having a resistance value of Z0–Rf is inserted in series with a parallel circuit including a semiconductor optical amplifier 35 and the diode D1.

When the burst control signal is changed from OFF to ON, the semiconductor optical amplifier 35 amplifies the optical data signal. At this time, the burst control signal amplifies the optical data signal by inputting a current in a forward direction to the semiconductor optical amplifier 35. The resistance in the forward direction of the semiconductor optical amplifier 35 is a very low value of about several Ω (Rf). On the other hand, the resistance in the reverse direction of the diode D1 of the impedance matching circuit 37 is considered to be effectively infinite. Thus, in order to impedance-match the characteristic impedance Z0 of an electric line 36 which transmits a burst control signal and the semiconductor optical amplifier 35 with each other, a resistor S3 having a resistance value of Z0-Rf is inserted in series with the semiconductor optical amplifier 35. With such a configuration, when the burst control signal is changed from OFF to ON, it is possible to prevent a delay in rising of the optical burst data signal.

When the burst control signal is changed from ON to OFF, the optical data signal needs to be turned off using the semiconductor optical amplifier 35. At this time, the burst control signal absorbs the optical data signal by inputting a current in the reverse direction to the semiconductor optical amplifier 35. The resistance of the semiconductor optical amplifier 35 in the reverse direction generally has a large value and is considered to be infinite effectively. On the other hand, a resistance Rd in the forward direction of the diode D1 of the impedance matching circuit 37 is about several Ω. Thus, in order to impedance-match the characteristic impedance Z0 of the electric line 36 and the semiconductor optical amplifier 35 with each other, the diode D1 is inserted in parallel with the semiconductor optical amplifier 35 in a reverse direction. With such a configuration, when the burst control signal is changed from ON to OFF, the optical burst data signal can be turned off by preventing the delay in falling of the optical burst data signal.

Sixth Embodiment

Figure 12:
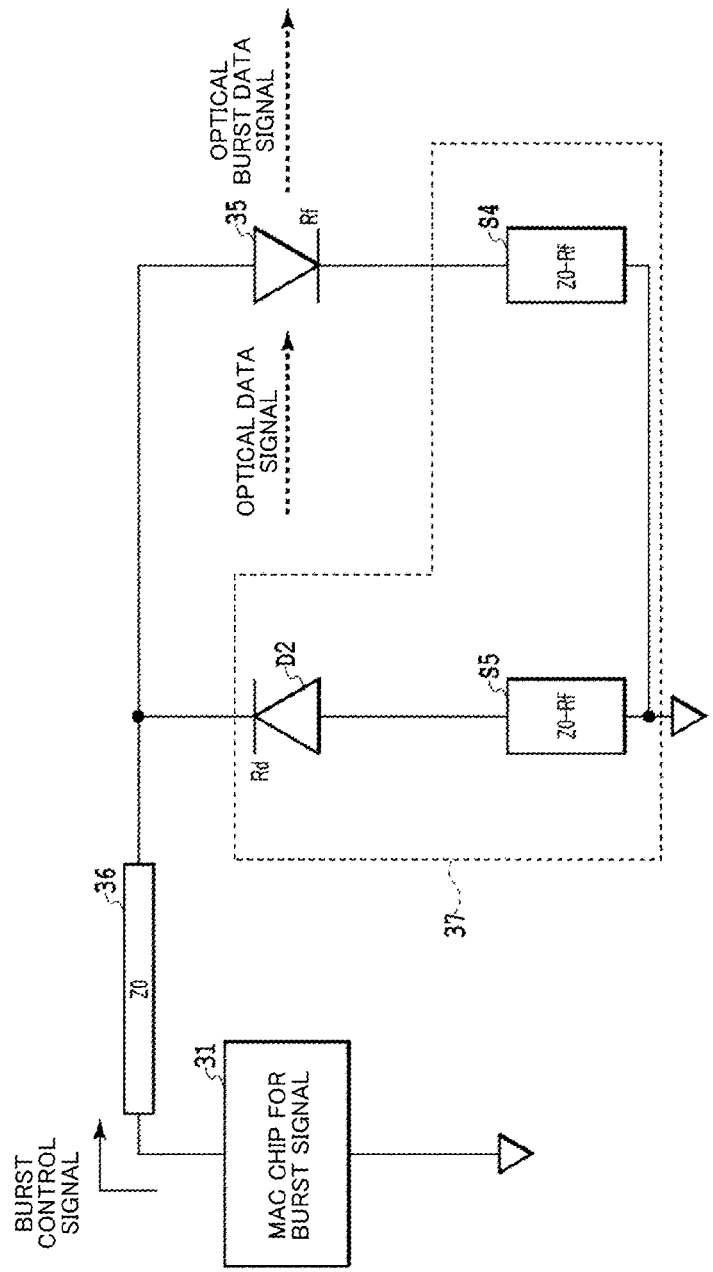
FIG. 12 is a diagram for explaining an operation of an optical burst transmitter according to a sixth embodiment.

An operation of an optical burst transmitter according to a sixth embodiment will be described with reference to FIG. 12. A burst control signal output from a burst signal MAC chip 31 is input to a semiconductor optical amplifier 35 through an electric line 36. An impedance matching circuit 37 of the sixth embodiment includes a resistor S4 having a resistance value of Z0–Rf in series with the semiconductor optical amplifier 35 and a series circuit including a diode D2 inserted in parallel with the semiconductor optical amplifier 35 in a reverse direction and a resistor S5 having a resistance value Z0–Rf. The diode D2 has the same resistance in the forward and reverse directions as the resistance value of the semiconductor optical amplifier 35.

When the burst control signal is changed from OFF to ON, the semiconductor optical amplifier 35 amplifies the optical data signal. At this time, the burst control signal amplifies the optical data signal by inputting a current in the forward direction to the semiconductor optical amplifier 35. The resistance in the forward direction of the semiconductor optical amplifier 35 is a very low value of about several Ω (Rf). On the other hand, the resistance in the reverse direction of the diode D2 of the impedance matching circuit 37 is considered to be effectively infinite. Thus, in order to impedance-match the characteristic impedance Z0 of an electric line 36 which transmits a burst control signal and the semiconductor optical amplifier 35 with each other, a resistor S4 having a resistance value of Z0–Rf is inserted in series with the semiconductor optical amplifier 35. With such a configuration, when the burst control signal is changed from OFF to ON, it is possible to prevent a delay in rising of the optical burst data signal.

When the burst control signal is changed from ON to OFF, the optical data signal needs to be turned off using the semiconductor optical amplifier 35. At this time, the burst control signal absorbs the optical data signal by inputting a current in the reverse direction to the semiconductor optical amplifier 35. The resistance in the reverse direction of the semiconductor optical amplifier 35 generally has a large value and is considered to be infinite effectively. On the other hand, a resistance Rd in the forward direction of the diode D2 of the impedance matching circuit 37 is about several Ω. Thus, in order to impedance-match the characteristic impedance Z0 of the electric line 36 and the impedance with each other, the diode D2 is inserted in parallel with the semiconductor optical amplifier 35 in the reverse direction. With such a configuration, when the burst control signal is changed from ON to OFF, the optical burst data signal can be turned off by preventing the delay in falling of the optical burst data signal.

INDUSTRIAL APPLICABILITY

The present invention is applicable to an optical burst transmitter.

The invention claimed is:

1. An optical burst transmitter including a control circuit configured to output a data signal and a burst control signal and a semiconductor optical amplifier configured to output an optical data signal modulated using the data signal as an optical burst data signal controlled using the burst control signal, the optical burst transmitter comprising:
    an electric line configured to connect the control circuit and the semiconductor optical amplifier and transmit the burst control signal; and
    an impedance matching circuit configured to impedance-match a characteristic impedance of the electric line and the semiconductor optical amplifier with each other,
    wherein the impedance matching circuit has a resistance value of Z0 in parallel with the semiconductor optical amplifier when a characteristic impedance of the electric line is Z0.

2. The optical burst transmitter according to claim 1, wherein the impedance matching circuit has a resistance value of Z0-Rf in series with the semiconductor optical amplifier when a resistance value in a forward direction of the semiconductor optical amplifier is Rf and a characteristic impedance of the electric line is Z0.

3. The optical burst transmitter according to claim 1, wherein the impedance matching circuit includes a first resistor having a resistance value of RP1 in parallel with the semiconductor optical amplifier and a second resistor having a resistance value of RS1 in series with the semiconductor optical amplifier and is set so that Math. 1

$$RP1 \times \frac{RS1 + Rf}{RS1 + RP1 + Rf} = Z0$$

is satisfied when a resistance value in a forward direction of the semiconductor optical amplifier is Rf and a characteristic impedance of the electric line is Z0.

4. The optical burst transmitter according to claim 1, wherein the impedance matching circuit includes a first resistor having a resistance value of RP1 in parallel with the semiconductor optical amplifier and a second resistor having a resistance value of RS1 in series with the semiconductor optical amplifier and is set so that RP1=Z0 is satisfied when a resistance value in a forward direction of the semiconductor optical amplifier is Rf and a characteristic impedance of the electric line is Z0.

5. The optical burst transmitter according to claim 1, wherein the impedance matching circuit includes a first resistor having a resistance value of RP2 in parallel with the semiconductor optical amplifier and a second resistor having a resistance value of RS2 in series with the parallel circuit composed of the semiconductor optical amplifier and the first resistor and is set so that Math. 2

$$0.82 \times Z0 < \frac{Rf \times RP2}{Rf + RP2} + RS2 < 1.22 \times Z0$$

$$0.82 \times Z0 < RS2 + RP2 < 1.22 \times Z0$$

is satisfied when a resistance value in a forward direction of the semiconductor optical amplifier is Rf and a characteristic impedance of the electric line is Z0.

6. The optical burst transmitter according to claim 1, wherein the impedance matching circuit includes a diode inserted in a reverse direction in parallel with the semiconductor optical amplifier and a resistor having a resistance value of Z0-Rf in series with the parallel circuit including the semiconductor optical amplifier and the diode, and the diode has the same resistance in forward and reverse directions as the resistance value of the semiconductor optical amplifier, when a resistance value in a forward direction of the semiconductor optical amplifier is Rf and a characteristic impedance of the electric line is Z0.

7. The optical burst transmitter according to claim 1, wherein the impedance matching circuit includes: a first resistor having a resistance value of Z0-Rf in series with the semiconductor optical amplifier; and a series circuit composed of a diode inserted in a reverse direction in parallel with the semiconductor optical amplifier and a second resistor having a resistance value of Z0-Rf, and the diode has the same resistance in a forward direction and the reverse direction as the resistance value of the semiconductor optical amplifier, when a resistance value in a forward direction of the semiconductor optical amplifier is Rf and a characteristic impedance of the electric line is Z0.

* * * * *